United States Patent
Kim

(10) Patent No.: US 8,902,931 B2
(45) Date of Patent: Dec. 2, 2014

(54) TRACK CIRCUIT APPARATUS FOR TRAIN

(71) Applicant: LSIS Co., Ltd., Anyang-si, Gyeonggi-do (KR)

(72) Inventor: Jae Wook Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 117 days.

(21) Appl. No.: 13/730,373

(22) Filed: Dec. 28, 2012

(65) Prior Publication Data

US 2013/0187010 A1 Jul. 25, 2013

(30) Foreign Application Priority Data

Jan. 19, 2012 (KR) .................. 10-2012-0006317

(51) Int. Cl.
*H04B 1/707* (2011.01)
*B61L 3/00* (2006.01)
*B61L 3/22* (2006.01)
*H04J 13/00* (2011.01)

(52) U.S. Cl.
CPC ............... *B61L 3/00* (2013.01); *H04J 13/0022* (2013.01); *B61L 3/221* (2013.01)
USPC .......................................................... 370/479

(58) Field of Classification Search
CPC .................................................. H04J 13/0022
USPC .......................................................... 370/479
See application file for complete search history.

(56) References Cited

U.S. PATENT DOCUMENTS

| | | | | |
|---|---|---|---|---|
| 5,677,930 A * | 10/1997 | Bottomley | .................... | 375/150 |
| 5,790,588 A * | 8/1998 | Fukawa et al. | ................ | 375/148 |
| 5,926,503 A * | 7/1999 | Kelton et al. | ................. | 375/148 |
| 6,128,332 A * | 10/2000 | Fukawa et al. | ................ | 375/146 |
| 6,144,653 A * | 11/2000 | Persson et al. | .................. | 370/337 |
| 6,507,573 B1 * | 1/2003 | Brandt et al. | ................. | 370/335 |
| 6,904,106 B2 * | 6/2005 | Papasakellariou et al. | ... | 375/341 |
| 7,239,650 B2 * | 7/2007 | Rakib et al. | .................... | 370/480 |
| 7,385,554 B2 * | 6/2008 | Zimmerman et al. | ........ | 342/464 |
| 7,400,608 B2 * | 7/2008 | Papasakellariou et al. | ... | 370/335 |
| 7,593,449 B2 * | 9/2009 | Shattil | ............ | 375/130 |
| 7,742,775 B2 * | 6/2010 | Myers | ........... | 455/456.1 |
| 7,965,761 B2 * | 6/2011 | Shattil | ............ | 375/147 |
| 8,660,206 B2 * | 2/2014 | Kohno | ............ | 375/296 |
| 2006/0140249 A1 * | 6/2006 | Kohno | ............ | 375/130 |
| 2007/0211786 A1 * | 9/2007 | Shattil | ............ | 375/141 |
| 2009/0110033 A1 * | 4/2009 | Shattil | ............ | 375/141 |

* cited by examiner

*Primary Examiner* — Jay P Patel

(74) *Attorney, Agent, or Firm* — Lee, Hong, Degerman, Kang & Waimey

(57) ABSTRACT

A track circuit apparatus for a train, the track circuit apparatus includes: a ground-based transmitter that is installed corresponding to each of a plurality of block sections divided from a track circuit formed by rails, digitally modulates transmission data by a carrier frequency predetermined and common for each of the block sections, assigns different pseudo random noise (PN) codes to adjacent block sections, and modulates and transmits the data; and a ground-based receiver or an on-train receiver that demodulates received data corresponding to a block section based on the carrier frequency of one of reception signals received from the block section and the PN code assigned to the block section.

6 Claims, 5 Drawing Sheets

TRACK CIRCUIT APPARATUS FOR TRAIN

CROSS-REFERENCE TO RELATED APPLICATION

Pursuant to 35 U.S.C. §119(a), this application claims the benefit of earlier filing date and right of priority to Korean Application No. 10-2012-0006317, filed on Jan. 19, 2012, the contents of which are hereby incorporated by reference herein in their entirety.

BACKGROUND OF THE INVENTION

1. Field of the Invention

The present invention relates to system control equipment for railways, and more particularly, to a track circuit apparatus for a train using DS-CDM (Direct Sequence-Code Division Multiplexing), a kind of digital data communication, which divides a pair of rails into a plurality of block sections, prevents signal interference between adjacent block sections, fading, or noise in data communication between a ground-based transmitter and a ground-based receiver for each block section and data communication between an on-train controller of the train and the ground-based transmitter and receiver (controller), and provides high success rate of data communication and excellent data encryption performance.

2. Description of the Conventional Art

Typically, a track circuit apparatus refers to a circuit that uses rails upon which a train travels as a part of an electrical communication circuit to detect a train traveling on the rails, or a circuit apparatus that performs data communication between an on-train controller (to be mounted on the train) and a ground-based controller by using rails as a transmission line.

A conventional example of this track circuit apparatus will be described below with reference to FIGS. 1, 2, and 3.

As described above, a pair of rails 1 is divided into a plurality of block sections, and a power supply unit B1 and B2, a current limiter C1 and C2, and a track relay 100*a* and 100*b* are connected to the rails 1 for each block section. Although not shown, the track circuit apparatus may further include a ground-based transmitter and a ground-based receiver which serve as a ground-based controller and an on-train receiver serving as an on-train controller.

The power supply unit B1 and B2 supplies electric current to detect the presence of a train 50 on the rails 1.

The current limiter C1 and C2 is a device that limits current in order to protect damage to the power supply unit B1 and B2 caused by short-circuit current when a train is on the rails 1 and the two rails 1 are short-circuited by an axle 50*a* of the train 50. The current limiter C1 and C2 may include a resistor and a reactor.

If the train 50 is not on the rail 1, the track relay 100*a* and 100*b* is magnetized by the current supplied from the power supply unit B1 and B2. Otherwise, if the train 50 is on the rails 1, the two rails 1 are short-circuited by the axle 50*a* of the train 50. Thus, the current supply from the power supply unit B1 and B2 is stopped, and the track relay 100*a* and 100*b* is dropped (demagnetized).

Accordingly, the ground-based receiver (not shown) to be connected to the track relay 100*a* and 100*b* can determine the presence of the train 50 on the rails 1 depending on the magnetized state or dropped(demagnetized) state of the track relay 100*a* and 100*b*.

According to one example of the conventional art, an example of a track circuit capable of transmitting and receiving data between the ground-based transmitter and the ground-based receiver or on-train receiver includes an audio frequency track circuit (hereinafter, abbreviated as AF track circuit).

In the AF track circuit (not shown), a ground control system (not shown) is installed on the ground for each block section, integrates information such as moving interval (distance) from preceding train, tunnel ahead, and the presence of a bridge to calculate a train speed for safe operation(that is moving) in a block section, performs frequency modulation (so-called "FM modulation") on moving information data containing train moving information data, such as the calculated train speed for the block section, a predetermined gradient of the rails 1 in the block section, an effective length of the block section, and a line type indicating whether the block section is on the Gyeongbu line or on the Honam line, and transmits the moving information data by the ground-based transmitter.

The ground-based receiver is installed on the ground for each block section, and is in signal connection with the track relay 100*a* and 100*b*. The ground-based receiver determines the presence of the train 50 on the block section depending on whether the track relay 100*a* and 100*b* is magnetized or demagnetized.

The on-train receiver is mounted and installed on the train 50, and receives data from the ground-based transmitter. The on-train receiver receives a frequency modulation signal containing moving information data from the ground-based transmitter, extracts the moving information data by a demodulator included therein, and controls moving of the train such as speed acceleration or deceleration based on the moving information data.

For insulation between individual block sections in FIG. 1, a physical insulation method may be used, such as preventing interference with the conduction of current through the rails 1 by cutting predetermined lengths of the rails 1 without disturbing moving of the train at the boundary between each block section to form air gaps.

Referring to FIGS. 2 and 3, four different carrier frequencies are used to perform frequency modulation on signals containing moving information data with an audio frequency and transmit the data; two frequencies of 2,040 Hz and 2760 Hz are used in four block sections of rails of a southbound lane, and two frequencies of 2,400 Hz and 3,120 Hz are used in four block sections of rails of a northbound lane. The southbound lane and the northbound lane are adjacent to each other.

The reason why four different carrier frequencies are used is to prevent interference between data signals in communication between adjacent block sections in an upward or downward direction and prevent interference between data signals between two adjacent lanes of northbound and southbound.

The above-described track circuit apparatus according to the conventional art uses four carrier frequencies as above, for example, in four block sections of a northbound lane and four block sections of a southbound lane, the northbound lane and the southbound lane being adjacent to each other. Thus, the ground-based receiver or on-train receiver for each four block sections of the northbound and southbound lanes needs to be provided in four types. This incurs high cost of device configuration.

Moreover, the track circuit apparatus according to the conventional art may undergo signal interference from an adjacent block section, fading, or noise because of a channel environment that changes from moment to moment. In the event of signal distortion caused by such interference, noise, etc, error correction and restoration of digital signals have a 50% probability of 0 or 1 and are made possible by the use of a variety of mathematical algorithms; whereas error correction and restoration of analog signals are made difficult due to high signal variability. That is, it is difficult to perform error correction and restoration of analog signals distorted at the ground-based or on-train receiver.

SUMMARY OF THE INVENTION

Therefore, the present invention has been made in an effort to solve the problems occurring in the conventional art, and a first object of the present invention is to provide a track circuit apparatus for a train which increases communication reliability by making a data signal resistant to the effect of an interference signal coming from an adjacent track, fading, or noise, and improves the success rate of data communication between a ground-based controller and an on-train controller by easily performing error correction or restoration even in the event of data signal distortion.

A second object of the present invention is to provide a track circuit apparatus for a train which increases the efficiency of error correction of a data signal.

A third object of the present invention is to provide a track circuit apparatus for a train which grants data confidentiality so as to prevent data change or data leak.

The first object of the present invention is accomplished by providing a track circuit apparatus for a train according to the present invention, the track circuit apparatus comprising:

a ground-based transmitter that is installed corresponding to each of a plurality of block sections divided from a track circuit formed by rails, digitally modulates transmission data at a carrier frequency predetermined and common for each of the block sections, and modulates by assigning different pseudo random noise (PN) codes to adjacent block sections and transmits the data; and a ground-based receiver or an on-train receiver that demodulates received data corresponding to a block section based on the carrier frequency of one of reception signals received from the block section and the PN code assigned to the block section.

The second objet of the present invention is accomplished by providing a track circuit apparatus for a train, wherein the ground-based transmitter further includes an error correction processor that performs channel coding for error correction on a baseband digital data signal.

The third objet of the present invention is accomplished by providing a track circuit apparatus for a train, wherein the ground-based transmitter further includes a data encryption processor that performs encryption on the baseband digital data signal.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

The objects of the present invention, the configuration for achieving the object and moving effects thereof will be understood more obviously by a detailed description of a preferred embodiment according to the present invention, with reference to FIGS. 4 to 11.

Figure 1:
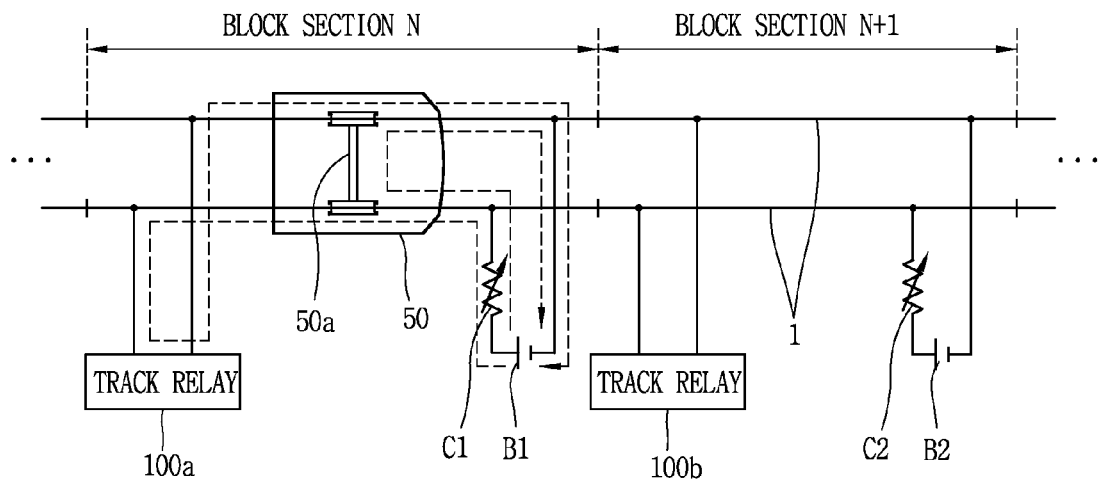
FIG. 1 is a block diagram showing the configuration of a track circuit apparatus for a train according to a related art.
Figure 2:
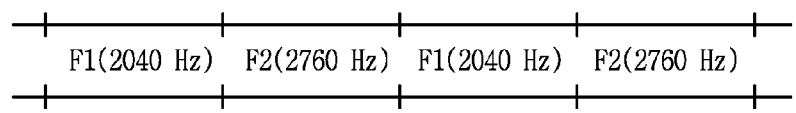
FIG. 2 is a view showing the configuration of carrier frequencies for block sections of a southbound lane, which depicts the assignment of two carrier frequencies for the block sections of the southbound lane in a track circuit apparatus for a train according to a related art.
Figure 3:
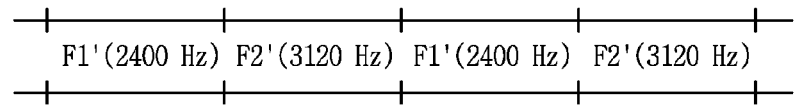
FIG. 3 is a view showing the configuration of carrier frequencies for block sections of a northbound lane, which depicts the allocation of two carrier frequencies for the block sections of the northbound lane in a track circuit apparatus for a train according to a related art.
Figure 4:
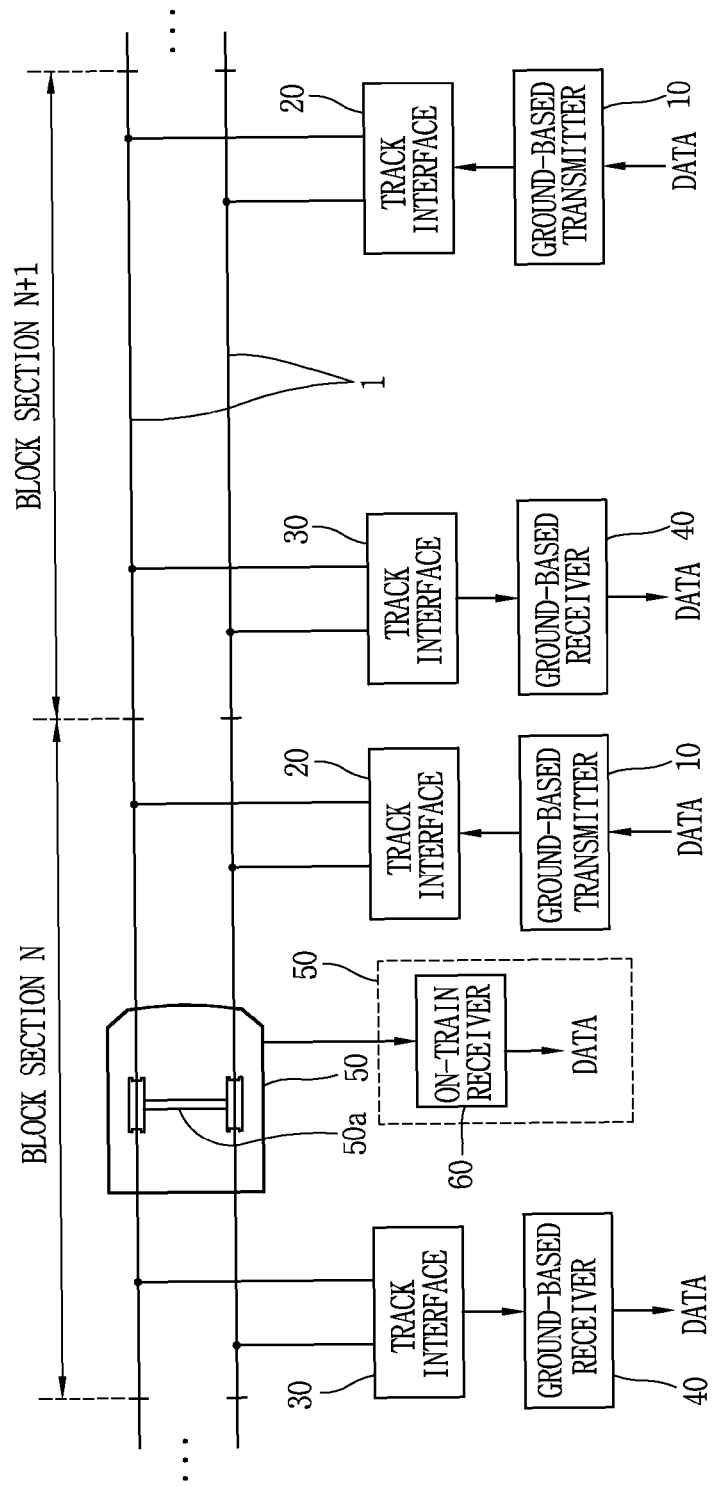
FIG. 4 is a block diagram showing the configuration of a track circuit apparatus for a train according to a preferred embodiment of the present invention.

Referring to FIG. 4, a track circuit apparatus for a train according a preferred embodiment of the present invention roughly includes a ground-based transmitter 10 and a ground-based receiver 40 or on-train receiver 60.

In FIG. 4, reference numeral 1 designates rails 1, and reference numeral 50 designates a train.

In FIG. 4, the ground-based transmitter 10 is installed corresponding to each of a plurality of block sections divided from a track circuit including two rails 1. Also, the ground-based transmitter 10 performs digital modulation of data with a common carrier frequency which is predetermined for each block section and transmits the modulated data. Herein, the ground-based transmitter 10 performs multiplying or exclusive OR operation different pseudo random noise (hereinafter, abbreviated as PN) codes to the data of adjacent block sections N and N+1 to be transmitted in FIG. 4, and transmits the modulated data.

Figure 11:
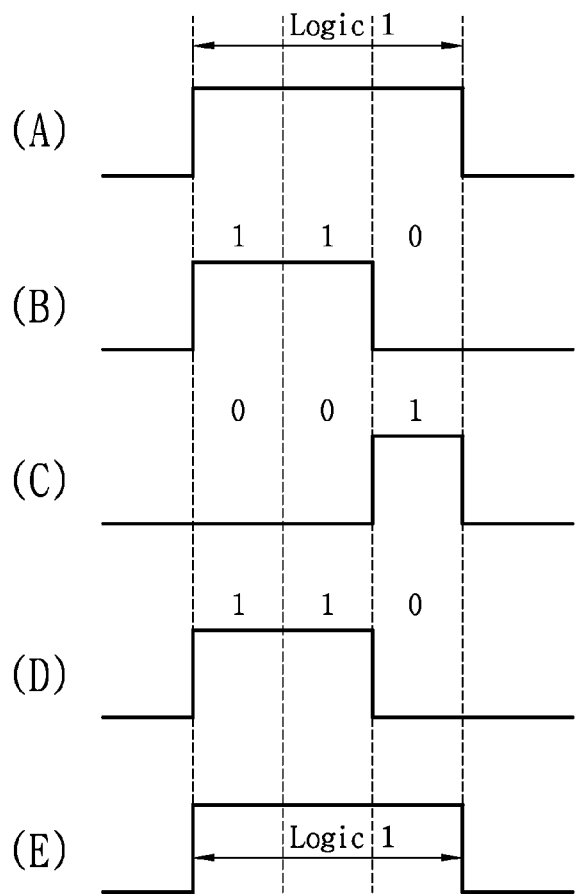
FIG. 11 is a view for explaining the procedure of data transmission and reception of data signals: (A) a binary digital signal of data to be transmitted; (B) a PN code signal at the ground-based transmitter; (C) a signal obtained by performing exclusive-OR operation the PN code at the ground-based transmitter; (D) a PN code at the ground-based receiver or on-train receiver; and (E) a signal obtained by performing exclusive-OR operation on received data and the PN code at the ground-based receiver or on-train receiver, in the track circuit apparatus for the train according to the preferred embodiment of the present invention.

A PN code is configured by a sequence of chips having values 0 and 1 as a high-speed signal waveform used to band-spread a digital symbol over a frequency region. The chip rate is several to several thousands of times of the bit rate. For example, as shown in the waveforms of FIG. 11, the PN code may have a binary value of 110.

Figure 8:
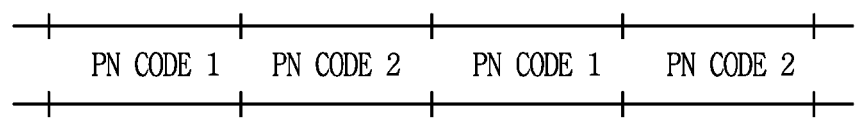
FIG. 8 is a view showing an example of assigning two PN codes to block sections of a southbound lane in the track circuit apparatus for the train according to the preferred embodiment of the present invention.
Figure 9:
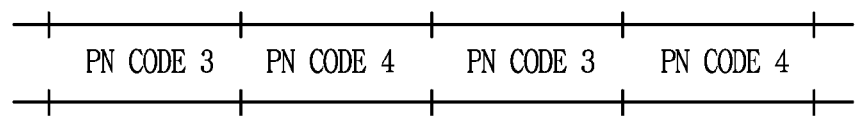
FIG. 9 is a view showing an example of assigning two PN codes to block sections of a northbound lane in the track circuit apparatus for the train according to the preferred embodiment of the present invention.

As shown in FIG. 8, the configuration of a PN code for each block section of a southbound lane, two different PN codes 1 and 2 may be assigned to adjacent block sections, and as shown in FIG. 9, two different PN codes 3 and 4 may be assigned to adjacent block sections.

Also, the same PN code may be configured to operate like a different type of PN code by delaying the starting point of the code by its unique chip for each track circuit (e.g., the northbound lane of the Gyeongbu line, the southbound lane of the Gyeongbu line, etc). That is, a PN code obtained by delaying the above PN code by its unique chip may be used as PN code 1, PN code 2, PN code 3, or PN code 4.

Figure 6:
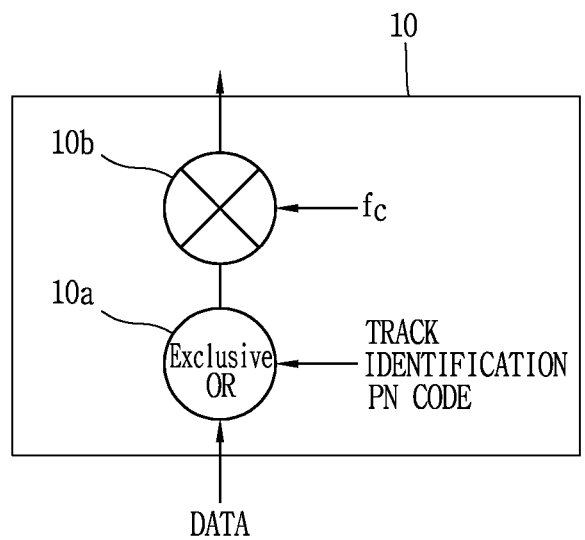
FIG. 6 is a block diagram showing an example of the configuration of a ground-based transmitter of the track circuit apparatus for the train according to the preferred embodiment of the present invention.
Figure 10:
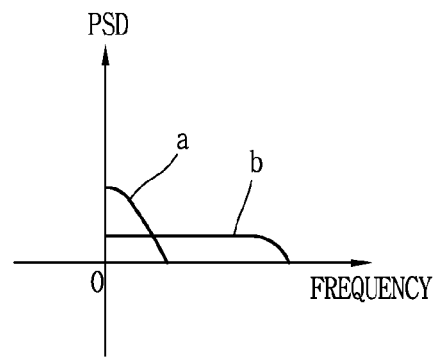
FIG. 10 shows a frequency signal for a digital data signal having a baseband frequency and a frequency signal obtained after performing exclusive-OR operation a PN code on the digital data signal.

Referring to FIG. 10, a PN code is called a pseudo random noise code because, although a data signal is a narrow band signal having a given amplitude, such as signal a, the data signal is spread into a wide-band frequency signal having a low power spectral density (PSD), such as signal b, by performing direct-sequence spread-spectrum processing (hereinafter, abbreviated as DSSS; refer to exclusive-OR operation on data the PN code by an EXCLUSIVE-OR operator 10a as shown in FIG. 6) by using the PN code, and this signal is similar to a noise frequency signal in that it has the above-mentioned characteristic and has a wide frequency band.

Accordingly, referring to FIG. 6, the ground-based transmitter 10 includes the exclusive-OR operator 10a and a modulator 10b.

The exclusive-OR operator 10a performs EXCLUSIVE-OR operation of a PN code pre-stored and assigned differently for each of the adjacent block sections on a baseband digital data signal containing information to be transmitted, so spreads the signal, as shown in the wave form (b) of FIG. 10.

The modulator 10b transmits an output signal from the exclusive-OR operator 10a by carrying on a carrier wave (fc) having a predetermined carrier frequency.

Figure 7:
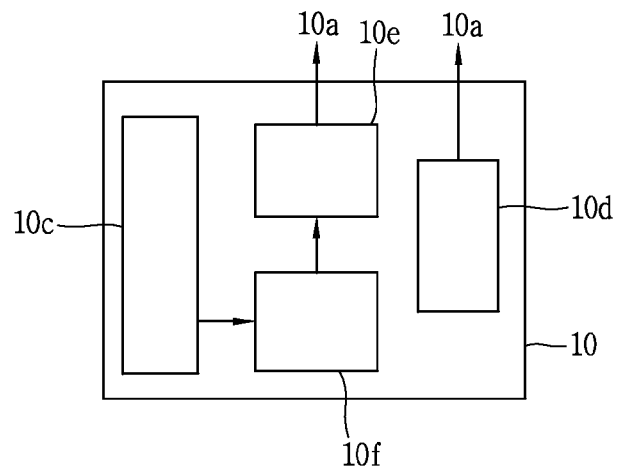
FIG. 7 is a block diagram showing the configuration of additional components to be included in the ground-based transmitter of FIG. 6.

Moreover, referring to FIG. 7, the ground-based transmitter 10 includes a data transmitter 10c which outputs moving information data containing vehicle moving information data, such as the information of distance from the foregoing train, the calculated train safe speed for a block section when considering the maximum speed of the train and the surrounding environment such as a forward tunnel or bridge, a predetermined gradient in the block section, an effective length of the block section, and a line type indicating whether the block section belongs to the Gyeongbu line or on the Honam line.

Furthermore, referring to FIG. 7, the ground-based transmitter 10 may further include a PN code storage circuit section 10d for pre-storing and outputting a PN code assigned to a block section.

Additionally, referring to FIG. 7, the ground-based transmitter 10 may further include a data encryption processor 10f which performs data encryption processing by encrypting the baseband digital data signal output from the data transmitter 10c. That is, the data encryption processor 10f is a unit for preventing data leak by encrypting (making confidential) the digital data signal to be transmitted.

In addition, referring to FIG. 7, the ground-based transmitter 10 may further include an error correction processor 10e which performs channel coding for error correction on the baseband digital data signal to be transmitted. Here, the channel coding may involve, for example, adding an error correction code to the data code of the digital data signal to be transmitted. Also, the error correction processor 10e is connected to the data encryption processor 10f, and performs channel coding to add an error correction code to the data encrypted by the data encryption processor 10f and outputs the data.

Besides, the error correction processor 10e transmits the digital data signal encrypted (confidential) and added with the error correction code to the exclusive-OR operator 10a to performs exclusive-OR operation.

Although an embodiment in which the ground-based transmitter 10 further includes the error correction processor 10e and/or the data encryption processor 10f is illustrated with reference to FIG. 7, the frequency bandwidth is spread by performing DSSS processing, i.e., multiplication or exclusive-OR operation of the PN code and the digital data to be transmitted by means of the exclusive-OR operator 10a according to the present invention or a multiplier, thereby giving confidentiality (encryption) effect. The error correction processor 10e and/or the data encryption processor 10f may be omitted from the ground-based transmitter 10.

Referring to FIG. 4, the track circuit apparatus for the train according to the preferred embodiment of the present invention includes a ground-based receiver 40 or an on-train receiver 60. The ground-based receiver 40 or the on-train receiver 60 demodulates received data of reception signals received from the block section based on the carrier frequency and the PN code assigned to the corresponding to a block section.

Figure 5:
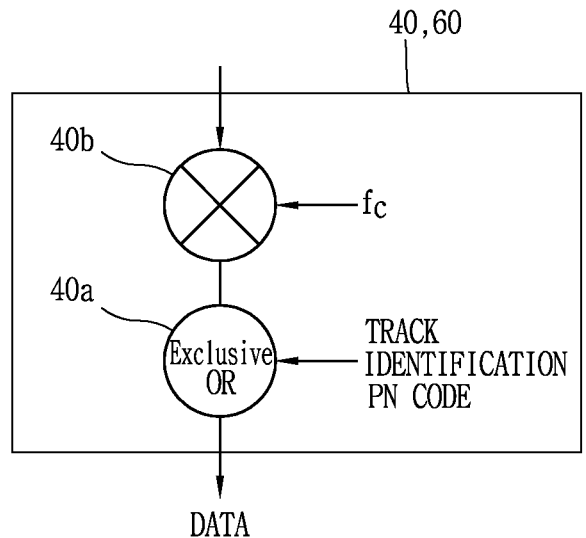
FIG. 5 is a block diagram showing an example of the configuration of a ground-based receiver or on-train receiver of the track circuit apparatus for the train according to the preferred embodiment of the present invention.

To this end, referring to FIG. 5, the ground-based receiver 40 or the on-train receiver 60 includes a demodulator 40b and an exclusive-OR operator 40a.

The demodulator 40b includes a filter circuit section that filters the carrier frequency from the received digital data signal to remove the carrier.

The exclusive-OR operator 40a carries out inverse spreading as shown in wave form a of FIG. 10 by performing exclusive-OR operation on the digital data signal from which the carrier wave is removed by the demodulator 40b and the PN code pre-stored and assigned differently for each of the adjacent block sections, and extracts information data for each block section transmitted from the ground-based transmitter 10.

Referring to FIG. 4, the track circuit apparatus for the train according to the preferred embodiment of the present invention may further include an interface 20 of the ground-based transmitter 10, for signal connection to the track circuit (see the rails 1) of the block section corresponding to the ground-based transmitter 10 per block section and an interface 30 of the ground-based receiver 40, for signal connection to the track circuit of the block section corresponding to the ground-based receiver 40 per block section.

The interface 20 or the interface 30 may include an impedance matching circuit which matches the impedance of the track circuit to the impedance of the ground-based transmitter 10 or ground-based receiver 40 to facilitate transmission and reception.

An operation of the thus-configured track circuit apparatus for the train according to the preferred embodiment of the present invention will be described with reference to FIGS. 4-11.

It is assumed that the ground-based transmitter 10 of FIG. 4 transmits digital data of logic 1 shown in FIG. 11(A) through the track circuit.

Referring to FIG. 7, digital data 1 to be transmitted is sent to the data encryption processor 10f to encrypt (make confidential) a digital data signal to be transmitted by the data encryption processor 10f, and the digital data signal is sent to the error correction processor 10e to allow the digital data signal to further include, for example, an error correction code.

Moreover, it is assumed that the PN code assigned to the block section is 110 as shown in FIG. 11(B).

Hereupon, the exclusive-OR operator 10a of FIG. 6 performs exclusive-OR operation on the digital data, i.e., 1, to be transmitted from the data transmitter 10c of FIG. 7 and the PN code 110 from the PN code storage circuit section 10d. Then, the result of the exclusive-OR operation will be 001 as shown in the waveform of FIG. 11(C).

Digital data of the result 001 of the exclusive-OR operation may be sent to the modulator 10b, and the modulator 10b may transmit the digital data by carrying on a carrier wave (fc).

Hereupon, the ground-based receiver 40 or the on-train receiver 60 receives the digital signal, the modulator included in the ground-based receiver 40 or on-train receiver 60 filters the carrier frequency from the received digital data signal to remove the carrier, and then outputs it to the exclusive-OR operator 40a.

Next, the exclusive-OR operator 40a performs exclusive-OR operation on the digital signal from which the carrier is removed by the demodulator 40b, that is, the digital signal of 001, and the pre-stored PN code 110.

Next, the digital data of logic 1 is restored as shown in the waveform of FIG. 11(E).

Accordingly, an operation controller (not shown) of the train to be connected to the on-train receiver 60 is able to operate the train safely based on moving information data of the restored received digital data, the moving information data containing an instructed operating speed of the train on the block section.

In this way, the track circuit apparatus for the train according to the present invention carries out data transmission and reception between the ground-based transmitter and the ground-based receiver or on-train receiver by performing direct-sequence spread-spectrum processing, that is, multiplication or exclusive-OR operation of the pre-stored same PN code. Therefore, even if analog noise is generated or interference occurs in the PN codes of adjacent block sections, the original transmitted data is extracted only when the PN code of the transmitting side and the PN code of the receiving side coincide with each other.

The track circuit for digital modulation and demodulation using DS-CDM is resistant to an interference signal coming from an adjacent track (i.e., adjacent block section) or noise, and therefore provides safe operation control of the train.

Because the track circuit apparatus for the train according to the present invention includes a ground-based transmitter which digitally modulates transmission data at a carrier frequency predetermined and common for each of block sections of rails, assigns different PN codes to adjacent block sections, and transmits the data, and a ground-based receiver or on-train receiver which demodulates the data from the received signal based on the PN codes assigned to the block sections, reliable data can be restored by performing digital modulation and demodulation by a code division multiplexing method using a pseudo random noise (PN) code, which is a kind of digital modulation method resistant to interference between data signals of adjacent block sections, fading, or noise, and data communication reliability can be guaranteed for the track circuit apparatus for the train to ensure a certain level of the success of moving information data communication.

In the track circuit apparatus for the train according to the present invention, the ground-based transmitter further includes an error correction processor which adds an error correction code to a baseband digital data signal to perform channel coding. Consequently, the original data can be restored easily by the error correction code even in the event of damage to the data received by the ground-based receiver or on-train receiver.

In the track circuit apparatus for the train according to the present invention, the ground-based transmitter further includes a data encryption processor for performing encryption of the baseband digital data signal. Consequently, data leak is prevented.

In the track circuit apparatus for the train according to the present invention, a tack interface facilitates transmission and reception by matching the impedance of the track circuit to the impedance of the ground-based transmitter or ground-based receiver.

What is claimed is:

1. A track circuit apparatus for a train, the track circuit apparatus comprising:
a ground-based transmitter that is installed corresponding to each of a plurality of block sections divided from a track circuit formed by rails, digitally modulates transmission data at a carrier frequency predetermined and common for each of the block sections, and modulates by assigning different pseudo random noise (PN) codes to adjacent block sections and transmits the data; and
a ground-based receiver or an on-train receiver that demodulates received data corresponding to a block section based on the carrier frequency of one of reception signals received from the block section and the PN code assigned to the block section,
an interface of the ground-based transmitter, for signal connection to the track circuit of the block section corresponding to the ground-based transmitter per block section; and
an interface of the ground-based receiver, for signal connection to the track circuit of the block section corresponding to the ground-based receiver per block section,
wherein the interface of the ground-based transmitter or the interface of the ground-based receiver comprises an impedance matching circuit that matches the impedance of the track circuit to the impedance of the ground-based transmitter or ground-based receiver to facilitate transmission and reception.

2. The track circuit apparatus of claim 1, wherein the ground-based transmitter comprises:
an exclusive-OR operator that performs exclusive-OR operation on a digital data signal containing information to be transmitted by a PN code pre-stored and assigned differently for each of the adjacent block sections, and spreads the signal; and
a modulator that transmits an output signal from the exclusive-OR operator by carrying on a carrier wave signal having a predetermined carrier frequency.

3. The track circuit apparatus of claim 2, wherein the ground-based transmitter comprises a data transmitter that outputs moving information data including an instructed train moving velocity for a block section, an effective length of the block section, and a line type.

4. The track circuit apparatus of claim 2, wherein the ground-based transmitter further comprises an error correction processor that performs channel coding for error correction on the digital data signal to be transmitted.

5. The track circuit apparatus of claim 1, wherein the ground-based transmitter further comprises a data encryption processor that performs data encryption by encrypting the digital data signal to be transmitted.

6. The track circuit apparatus of claim 1, wherein the ground-based receiver or on-train receiver comprises:
  a demodulator that filters the carrier frequency signal from the received digital data signal to remove the carrier wave; and
  an exclusive-OR operator that carries out inverse spreading by performing exclusive-OR operation the PN code pre-stored and assigned differently for each of the adjacent block sections on the digital data signal from which the carrier wave is removed by the demodulator, and extracts information data for each block section transmitted from the ground-based transmitter.

* * * * *